Dec. 2, 1947.  C. R. WASEIGE  2,431,716
HYDRAULIC SHOCK ABSORBER
Filed May 6, 1941

Inventor.
Charles R. Waseige
By Hascock Downing & Seebold
Attorneys.

UNITED STATES PATENT OFFICE 2,431,716

HYDRAULIC SHOCK ABSORBER

Charles Raymond Waseige, Rueil, France; vested in the Attorney General of the United States Application May 6, 1941, Serial No. 392,169
In France June 8, 1940

4 Claims. (Cl. 267—64)

This invention relates to the hydraulic shock absorbers, more particularly adapted to be used in landing gears for aircraft, of the kind comprising two bodies telescopically sliding relatively to each other, the relative displacement of said bodies being effected in the one direction by the action of an external force against a yielding medium and causing a liquid—usually oil—to be forcibly driven through a passage, the free section of which is relatively large, and in the other direction by the action of the expansion of said medium which has been energized by compression, the speed of this expansion being limited by the throttling of the liquid flow.

Where the aforesaid yielding medium is compressed air contained in a chamber the volume of which varies in response to the relative position of said bodies, the shock absorbers are known as hydro-pneumatic shock absorbers.

The shock absorbers adapted to be used on aircraft are required not only to be strong enough to resist without risk of failure all the strains likely to be encountered in use, but also to be of light weight, as compact as possible, and able to be tilted in every direction without impairing the operation thereof. The last-mentioned characteristic is particularly useful in case the shock absorber is to be mde a part of a retractable landing gear for the housing of which only a very limited space is available in the airplane structure.

One essential object of this invention is to provide a new and improved construction of shock absorber fully answering to the special requirements and conditions of use on aircraft and remarkable in that the space into which the same can be lodged, at rest, is very small relatively to its power.

In view of this main object, the present invention consists in a hydraulic shock absorber of the aforesaid kind in which the relative displacement of the two bodies telescopically sliding relatively to each other in the direction of the extension of the assembly corresponds to the energization course of the yielding medium, while the relative displacement of said bodies in the direction of the contraction of the assembly corresponds to the deenergization course, the speed of which is braked by throttling the flow of liquid.

This results in a construction of shock absorber the length of which, in the position of rest, is reduced to a minimum as compared with the usual constructions hitherto used.

In accordance with a preferred embodiment of this shock absorber, the same comprises two tubular bodies one of which is provided with a bottom member and serves as a cylinder and the other of which, having a smaller diameter than the first one and sliding therein, is closed at the end thereof which is inserted in said first body by a one-way valve adapted to be pressed upon its seat by the liquid returning from the first body into the second body as the shock absorber is contracting, said valve being adapted then to present a throttled passage for the flow of liquid.

The second or inner tubular body may conveniently serve as a cylinder for a sealing piston engaging with the walls thereof and normally contacting with the upper surface of the liquid therein, said piston having a passage normally closed by a valve which is adapted to open—preferably automatically—as said piston rises in said body above a predetermined level, thus allowing the shock absorber to be drained for filling same.

Oil leakages are thus avoided whatever may be the angle of inclination of the shock absorber.

When using compressed gas as the aforesaid yielding medium—and this is an advantageous feature of the invention—the second or inner tubular body carries at the end inserted in the first or outer body a sealing device acting as a piston, while another sealing device or a stuffing box carried by said outer body clamps the second body where it emerges from said outer body so as to form between the two bodies a sealed annular chamber of substantial space into which compressed gas is introduced whose volume varies in proportion but in a reverse ratio with the length of the shock absorber.

This gas chamber may easily be given a sufficient inner space to allow of dispensing with any additional reservoir requiring delicate piping and couplings.

The present invention has also for its object a landing gear embodying a shock absorber the expansion course of which corresponds to its energization and which advantageously though not necessarily comprises the aforesaid features, and more particularly a landing gear of the kind described in U. S. Patent application No. 226,569, filed on the 24th of August, 1938, now Patent No. 2,264,923, dated December 2, 1941, in which said shock absorber acts as an accumulating device and is carried by the foldable elements of the gear so as to accumulate energy during the lifting of the gear and to restore this energy during the descent of the gear controlled thereby at a speed limited thereby.

In a preferred embodiment, in which said landing gear consists of a supporting frame hinged to the structure of the aircraft and carrying a wheel or the like and of a folding strut holding said frame in depressed or lowered position, the shock absorber of the aforesaid kind is coupled between the upper part of said frame and the lower part of said strut without requiring the provision of a hinged system therebetween.

Other features and advantages of this invention will be apparent from the following description and the accompanying drawings, given solely as an example and in which.

Figure 3:
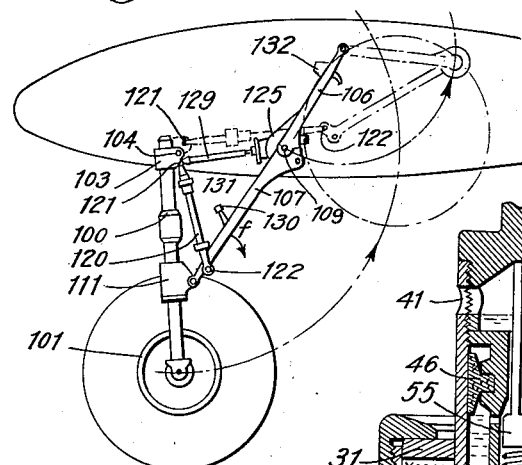
Fig. 3 shows a landing gear according to the invention in which its low position and, in dotted lines, part of its elements in an intermediate position.

The two cylindrical or tubular bodies 1 and 2 are telescopically mounted relatively to each other. The outer body or tube 1, i. e., that of larger diameter, has a bottom member 3 underneath which said tube is integrally connected with fastening devices by means of which it may be operated and secured. Other devices adapted to fasten the shock absorber are integral with a jointing member 5 connected by a screw-thread with the upper end of the inner body or cylinder. Member 5 also serves as a head or end wall for the outward end of the inner tubular member 2.

The bottom member 3 is provided with a passage 6 communicating with the outside through a non-return valve member 7 co-acting with a seat presented by a pipe union or coupling 8 normally closed by a cap 10. The valve member 7, adapted to be used for filling the shock absorber with liquid, carries a protruding stem 12 by means of which said member may be opened from the outside. A similar valve 16, mounted by means of a coupling 17 on the wall of the outer tube 1, permits of introducing compressed gas into the latter, said valve being protected by a cap 20. A pressure gauge 21 is connected with coupling 17. It is thus seen that a fixed quantity of compressed gas is introduced into the annular space between tubular members 1 and 2. The tube 2 acts as a piston inside the outer tube 1 and, for this purpose, it carries on the one hand at its lower end a series of sealing gaskets 25 engaging with the inner wall of said outer tube 1; on the other hand, the part of said inner tube 2 that emerges from said outer tube 1 is surrounded by a stuffing-box 27 mounted in the latter at the upper end thereof. Said stuffing-box 27 is covered by a layer of grease 30 protected by a washer 31 which is held in position by a flanged collar 32 having a threaded engagement with the upper end of body 1.

A plug 35 is screwed to the lower end of the inner tubular body 2 and is provided with a central opening 36 the mouth of which is formed as a seat for a perforated plate-valve 37. In front of said seat, the plug 35 carries a stop flange 38 adapted to limit the downward or opening movement of valve 37. Plug 35 also serves as a head or end wall for the inward end of the inner tubular member 2.

At its upper end the inner tube 2 communicates with the open air by means of ports 40 provided in its side wall and registering with openings 41 provided in the jointing member 5. The latter serves as a stop for a piston 45 adapted to slide freely in the inner tube 2 and sealed in the tube as cylinder 2 by means of a gasket 46 carried by said piston and engaging with the wall of said tube 2. Inside said piston 45 is provided a recess 48 permanently connected with the inside of tube 2 between said piston and the plug 35. An axial bore 52 connects said recess 48 with the upper portion of the mentioned space in tube 2. Said bore 52 is enlarged at its lower part so as to form the seat of a valve 55 having a stem projecting through the bore. A spring inserted in the recess 48 urges said valve 55 against its seat. The whole device is so arranged that the stem 56 engages with the jointing member 5 for opening the valve 55 when the piston 45 abuts against said jointing member at the end of its stroke.

Figure 1:
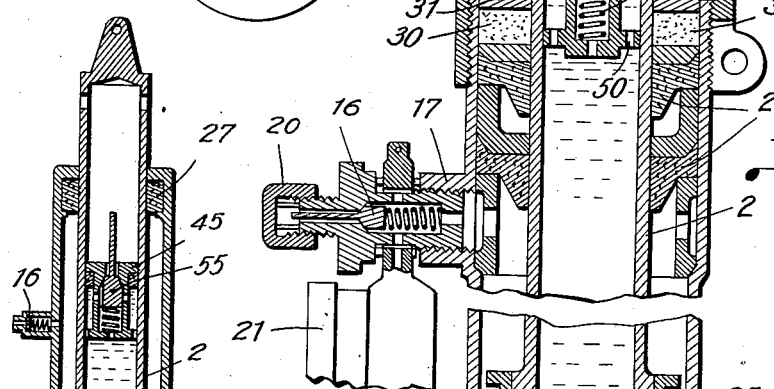
Fig. 1 is a sectional elevation of a shock absorber, the middle part being broken away.

To condition the shock absorber for use, the chamber formed between the sealing gaskets 25 and the stuffing box 27 is filled with compressed air through the valve 16 which causes the gaskets, together with the inner tube 2, to be yieldingly urged downwardly as in Fig. 1, the position of rest of the shock absorber corresponding to the abutment of the plug 35 against the bottom member 3. Oil is then introduced into the shock absorber through the coupling 8 so as to fill the interior of tube 2. During the filling operation, the piston 45 is lifted in accordance with the rise of the liquid. When the piston reaches the end of its stroke, as shown in Fig. 1, the valve 55 opens, thereby relieving any air that may overlie the layer of liquid. The appearance of leakage oil issuing through the holes 40 indicates that the filling operation is completed.

During use, the extension stroke corresponds to the compression of the air cushion and to the free flow of liquid through the opening 36 at the lower part of tube 2. As soon as this stroke is completed, the compressed air tends to return the tube 2 downwardly and to return the liquid into said tube During this movement (Fig 2), the valve 37 closes itself and the liquid can only flow through the hole or holes provided at the center of said valve, which throttles the flow and causes a braking action reducing the speed of expansion of the shock absorber.

Figure 2:
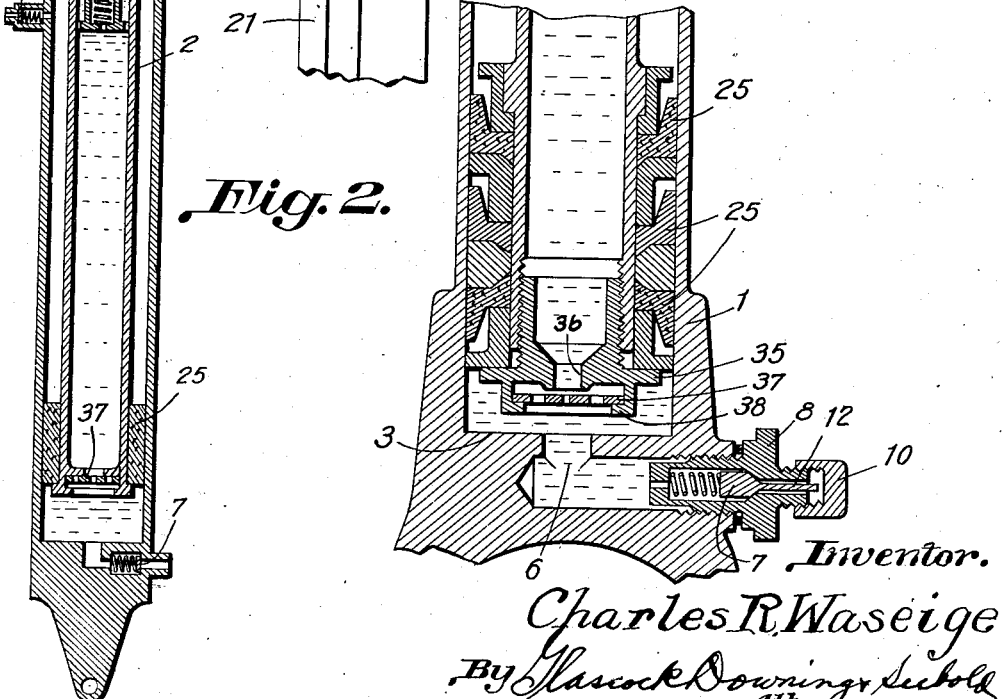
Fig. 2 shows diagrammatically the assembly on a reduced scale with the elements in another position.

As shown in Fig. 2, the piston 45 follows the variations of the liquid level, isolates the liquid from the surrounding air and avoids any leakage, particularly in inclined positions of the shock absorber.

Figure 4:
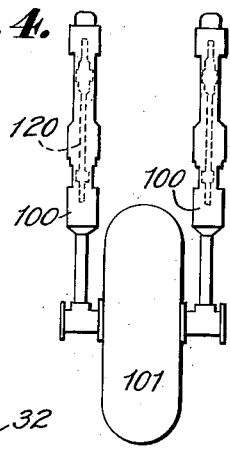
Fig. 4 is a corresponding front view.

Figs. 3 and 4 show a landing gear in which the new shock absorber acts as an accumulator during its descent.

This landing gear comprises substantially one or two landing gear shock absorbers 100, of the usual kind, to the end of which a landing wheel or the like 101 is secured. This shock absorber is supported at its upper end by a clamping collar 103 hinged to the aircraft structure through the medium of a shaft 104. Each landing gear shock absorber 100 is held by a folding strut consisting of two links 106 and 107 hingedly jointed together at 109 and one of which, 106, is pivoted to the aircraft structure, while the other, 107, is pivoted to a collar 111 clamping the shock absorber 100 at its lower end.

A shock absorber 120 according to the present invention of the above described type 120 is directly coupled between a pivot 121 carried by the collar 103 and a pivot 122 carried by the link 107. As viewed in Fig. 4, this shock absorber 120 is entirely hidden at the front by the conventional shock absorber 100 and thus takes no extra space in the transverse direction.

It will be assumed that the landing gear is of the driving hinge connection kind and comprises a lifting motor assembly contained in a casing 125 arranged at the hinge connection 109 of the links 106 and 107.

This landing gear is completed by low and high position locking devices, respectively, consisting of fingers 129 and 130 co-acting with hooking systems 131 and 132. A landing gear of this kind is described in U. S. Patent application No. 226,569 filed on the 24th of August, 1938, under the name of the applicant.

The described landing gear operates as follows:

During the lifting stroke effected in response to the operation of the relative rotation of the links 106 and 107 by the driving mechanism contained in the casing 125, the link 107 swings in the direction of the arrow f relatively to the shock absorber 100. This causes extension of the shock absorber 120, i. e., a compression of the air or the like contained therein and an accumulation of expansive power therein. The linkage is so arranged that at the end of the lifting stroke, as shown in dotted lines, the pivot 121 is located above the shaft 104, so that the turning couple imparted to the landing gear by the shock absorber 120 is slightly negative though remaining smaller than that produced by the weight of the landing gear, so as to relieve the locking device 130—132 when the landing gear is lifted.

For lowering the gear, the finger 130 is disengaged, which causes the gear to move down under the conjoint action of its own weight and of the force imparted to it by the shock absorber jack 120, which at the same time acts as a brake for limiting the speed of this lowering stroke.

While I have illustrated and described the preferred form of construction for carrying my invention into effect, this is capable of variation and modification, without departing from the spirit of the invention. I therefore do not wish to be limited to the precise details of construction set forth but desire to avail myself of such variations and modifications as come within the scope of the appended claims.

What I claim is:

1. In a hydraulic shock absorber of the type involving slidably telescoped tubular members, the outer of the tubular members having one end closed, an end wall for the inward end of the inner tubular member, the outward end of the inner tubular member being open to the atmosphere, first stuffing means carried by the inward end of the inner member in slidable sealing relation to the interior of the outer member, second stuffing means at the end of said outer member opposite its closed end, said second stuffing means being in slidable sealing relation to the exterior of the inner member, means establishing permanent communication between the interior of said inner member and the interior of the outer member at a point between said first stuffing means and the closed end of the outer cylinder, a fixed quantity of resilient fluid means in the space defined between the inner and outer members and said first and second stuffing means, said resilient fluid means being introduced into said latter space at greater than atmospheric pressure, a floating piston slidably mounted in said inner tubular member, passage means formed in said piston for establishing communication between the interior of said inner member and the outside atmosphere, normally closed valving means in said passage, and means for automatically opening said valving means when said piston slides a predetermined distance toward the outward end of said inner tubular member.

2. In a hydraulic shock absorber of the type involving slidably telescoped tubular members, the outer of the tubular members having one end closed, end walls respectively for the inward and outward ends of the inner tubular member, first stuffing means carried by the inward end of the inner member in slidable sealing relation to the interior of the outer member, second stuffing means at the end of said outer member opposite its closed end, said second stuffing means being in slidable sealing relation to the exterior of the inner member, means establishing permanent communication between the interior of said inner member and the interior of the outer member at a point between said first stuffing means and the closed end of the outer cylinder, a fixed quantity of resilient fluid means in the space defined between the inner and outer members and said first and second stuffing means, said resilient fluid means being introduced into said latter space at greater than atmospheric pressure, passage means formed at the outward end of said inner tubular member and establishing communication between the interior of said inner member and the outside atmosphere, a piston freely sliding in said inner tubular member and arranged to approach the inward end wall of said inner member thereby dividing the inner tubular member into inner and outer compartments, said piston being formed with an opening therethrough, the ends of said opening respectively communicating with said compartments, a spring closed valve on said piston normally closing the opening in the piston, and a body of liquid filling the space between the closed end of the outer cylinder and said first stuffing means and also filling said inner compartment, said spring closed valve having an element arranged to engage the outward end wall of the inner member so as to open the valve whenever the piston is moved to a position adjacent to said outward end wall.

3. A hydraulic shock absorber comprising an outer tubular member closed at one end, an inner tubular member slidably telescoped in said outer member, end walls respectively for the outward and inward ends of said inner tubular member; first stuffing means carried by said inner member and establishing fluid-tight sliding engagement between it and said outer member thereby forming a first space between the proximate ends of said outer and inner members and said first stuffing means, second stuffing means closing the outward end of said outer member around said inner members to form a fluid-tight second space defined between said outer and inner members and said first and second stuffing means, means providing permanent communication between the interior of said inner tubular member and said first space, a fixed quantity of resilient fluid means compressed at greater than atmospheric pressure in said second space and effective at all times as a main spring means to resist the extension of said inner and outer members and thereby being adapted to expand to return said inner member into said outer member, liquid means within said first space and within the interior of said inner member, means arranged to throttle the flow through said permanent connection means between the interior of the inner member and said first space as said inner member is returned into said outer member from an outdrawn position, a piston freely slidable in said inner tubular member between said respective end walls, the outward end of the inner member being provided with at least one passage leading from the outside atmosphere into the interior of said inner member at a point located between the outward end wall and said piston, a conduit extending longitudinally through said piston, valve means normally closing said conduit, and means arranged to open said valve means as said piston moves to a position adjacent to the outward end wall of said inner tubular member.

4. A hydraulic shock absorber comprising an outer tubular member closed at one end, an inner tubular member slidably telescoped in said outer member, end walls respectively for the outward and inward ends of said inner tubular member, first stuffing means carried by said inner member and establishing fluid-tight sliding engagement between it and said outer member thereby forming a first space between the proximate ends of said outer and inner members and said first stuffing means, a second stuffing means closing the outward end of said outer member around said inner member to form a fluid-tight second space defined between said outer and inner members and said first and second stuffing means, means providing permanent communication between the interior of said inner tubular member and said first space, a fixed quantity of resilient fluid means compressed at greater than atmospheric pressure in said second space and effective at all times as a main spring means to resist the extension of said inner and outer members and thereby being adapted to expand to return said inner member into said outer member, liquid means within said first space and within the interior of said inner member, means arranged to throttle the flow through said permanent connection means between the interior of the inner member and said first space as said inner member is returned into said outer member from an outdrawn position, a piston freely slidable in said inner tubular member between said respective end walls, said piston having a passage extending longitudinally therethrough, valve means normally closing said passage, and means arranged to open said valve means as said piston moves to a position adjacent to the outward end wall of said inner tubular member, said valve means comprising a stem arranged to engage the outward end wall in a manner to open said valve means as said piston moves into said position adjacent to said outward end wall.

CHARLES RAYMOND WASEIGE.

REFERENCES CITED

The following references are of record in the file of this patent:

UNITED STATES PATENTS

| Number | Name | Date |
|---|---|---|
| 2,154,984 | Levy | Apr. 18, 1939 |
| 2,165,465 | Ebrhardt et al. | July 11, 1939 |
| 2,184,260 | Sutton | Dec. 19, 1939 |
| 2,220,546 | Saulnier | Nov. 5, 1940 |
| 2,224,481 | Laraque | Dec. 10, 1940 |
| 1,104,945 | Westinghouse | July 28, 1914 |
| 1,055,164 | Green | Mar. 4, 1913 |
| 2,146,089 | Onions | Feb. 7, 1939 |

FOREIGN PATENTS

| Number | Country | Date |
|---|---|---|
| 825,790 | France | Dec. 16, 1937 |
| 503,789 | Great Britain | Apr. 13, 1939 |
| 393,766 | Germany | Apr. 7, 1924 |